May 29, 1923.

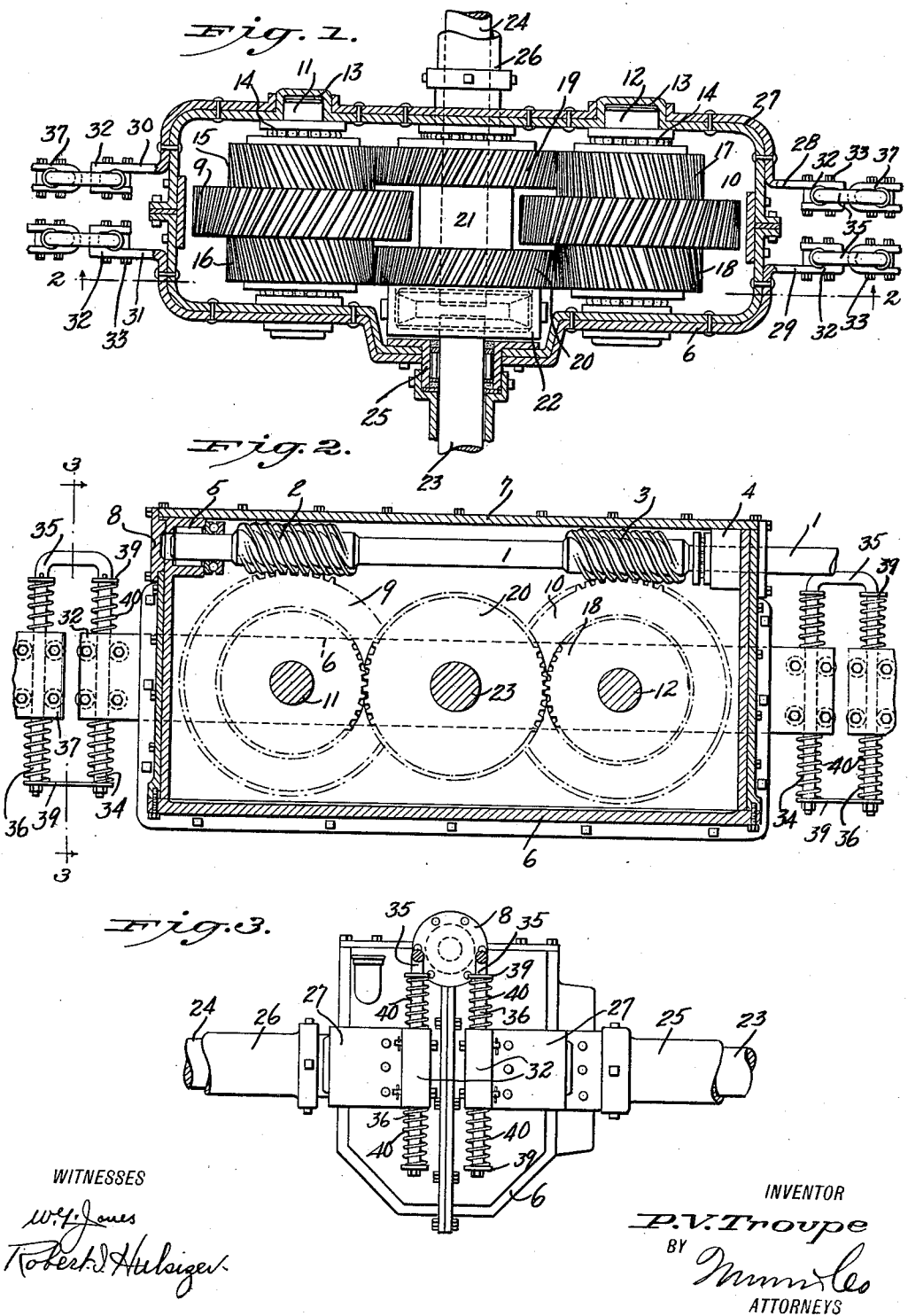

P. V. TROUPE

TRANSMISSION GEARING UNIT

Filed Nov. 4, 1921

WITNESSES
W. T. Jones
Robert S. Hulsizer

INVENTOR
P. V. Troupe
BY Munn & Co.
ATTORNEYS

Patented May 29, 1923.

1,457,236

UNITED STATES PATENT OFFICE.

PAUL V. TROUPE, OF MOLINE, ILLINOIS.

TRANSMISSION-GEARING UNIT.

Application filed November 4, 1921. Serial No. 512,720.

*To all whom it may concern:*

Be it known that I, PAUL V. TROUPE, a citizen of the United States, and a resident of Moline, in the county of Rock Island and State of Illinois, have invented a new and Improved Transmission-Gearing Unit, of which the following is a full, clear, and exact description.

This invention relates to a transmission gearing unit, and has for an object the provision of an efficient, compact unit supported in a housing which is flexibly suspended from the body of a vehicle.

Another object resides in the provision of means whereby the thrusts and strains on the rotating gears are very simply and efficiently balanced to avoid lateral play and thrusts.

A further object resides in the provision of means whereby the gearing unit casing is so supported from a fixed point on the vehicle as to permit movement of the casing relative thereto.

A still further object resides in the particular construction and arrangement of parts which are hereinafter described and claimed and shown in the accompanying drawings.

The invention is illustrated in the drawings of which—

Figure 1 is a plan view of the gearing unit with the casing shown in section.

Fig. 2 is a vertical section taken on the line 2—2 of Fig. 1.

Fig. 3 is an end view of the unit.

Figure 4:
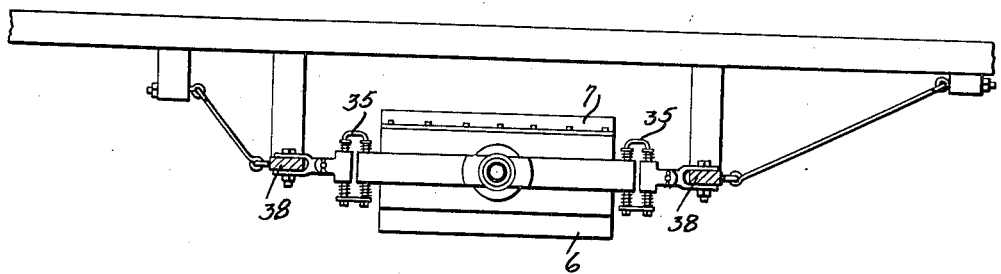
Fig. 4 is a side view of the unit showing it suspended from the body of a vehicle.
Figure 5:
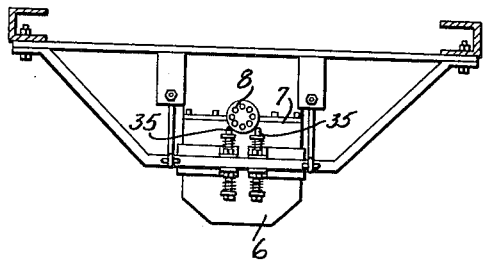
Fig. 5 is a front view of the body in position on the vehicle.

As shown in the drawings, I have disclosed a preferred form of my invention although it is to be understood that various modifications in the arrangement and construction of the parts may be adopted without departing from the spirit of the invention.

As illustrated, the gearing unit comprises a driving shaft 1 having thereon a pair of worms 2 and 3. This shaft is suitably supported in journal boxes 4 and 5 mounted upon a casing or housing 6 and the shaft extends along the upper portion of said housing. This housing 6 is provided with any suitable cover portion 7. The housing is also provided with a removable plate 8 adjacent the end of shaft 1 so that access may be had thereto. The worms 2 and 3 are adapted to mesh with large toothed gears 9 and 10 which are mounted respectively on shafts 11 and 12 the ends of which are suitably supported in journal or bearing recesses 13 formed in the middle of the housing 6. Suitable ball-bearing units such as 14 are provided. Fixedly connected on each side of the large gears 9 and 10 are disposed gears of smaller diameter, such as 15, 16, 17 and 18. These smaller gears may be connected in any suitable manner to the larger gears 9 and 10 and are adapted to move therewith. These gears 15 to 18, inclusive, mesh with a pair of gears 19 and 20 mounted on a sleeve 21 and fastened thereto in any suitable manner. To the sleeve 21 is connected a differential casing 22.

In detail, and as shown in Fig. 1 particularly, the gears 15 and 17 mesh with the gear 19 on opposite sides thereof, and likewise the gears 16 and 18 mesh with gear 20 on opposite sides thereof. It will be seen, therefore, that the engagement of the worm gears 2 and 3 with the ring gears 9 and 10 will cause a motion of the gears 15 and 18 and, consequently, a motion of the gears 19 and 20, the engagement of these gears with each other being perfectly balanced so that no lateral or abnormal stresses are produced. The movement given to the sleeve 21 will cause the movement of the differential casing 22. This casing is of any well-known construction and is connected to any suitable axles such as 23 and 24. The axle 24 may pass through the sleeve 21. These axles 23 and 24 may be journaled in suitable journal boxes 25 and 26 of any desired design disposed in the housing 6 at the proper points.

A strap 27 of any suitable dimensions passes substantially around the middle of the sides of the housing 6 and is riveted or otherwise connected thereto at suitable intervals. This strap has end portions, such as 28, 29, 30 and 31, arranged in pairs at opposite ends of the housing and which are provided with bent U-shaped supporting brackets such as 32 and a plurality of clamping bolts 33 to receive one leg 34 of a flexible U-shaped connecting link 35. The other leg 36 of this link is adapted to be received in a similar bracket 37 connected to a fixed portion of the vehicle, such as 38 in Fig. 4, which may be a cross-beam or other suitable member. The legs 34 and 36 of the flexible links 35, of which there are two disposed at each end of the gear housing 6, are provided with a plurality of collars or plates such as 39 between which and the brackets 32 and 37 are disposed springs such as 40 so that a relative movement of the brackets 32 on the legs of the links 35 is permitted, as well as a relative movement between the legs 36 and the brackets 37. Furthermore, the legs of the U-shaped link 35 are not rigidly connected to their respective brackets, so that a rotary movement in the horizontal plane of these links is permitted, thereby a horizontal as well as a vertical displacement of the gearing in the housing is allowed by reason of the flexible link connected between the housing and the points of support.

Figure 6:
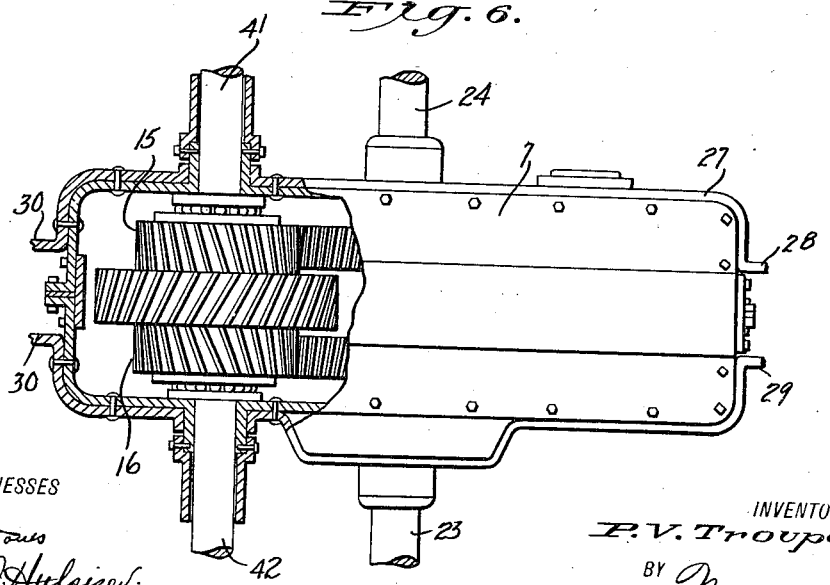
Fig. 6 is a plan view with a part of the housing broken away, showing the modified form of the invention.

In Fig. 6, the modified form comprises the extension of the shaft 11 in the form of axles 41 and 42 outwardly from the housing 6 to provide means whereby additional apparatus may be connected to this unit and from which different speed ratios may be obtained. In other respects the construction shown in this figure is identical with that previously described.

It will, therefore, be seen that I have provided a simple, efficient transmission gearing unit in which the driving and transmission of power from the various gears is so balanced as to eliminate the production of lateral stresses and strains in the various gears and in which the housing is so supported from fixed points as to permit a very considerable flexibility thereto in the severe operation or usage to which vehicles on which this unit is used may be put.

What I claim is:

1. A gearing unit which comprises a driving shaft, a pair of worms thereon, a pair of ring gears meshing respectively with the worms, smaller gears connected rigidly on opposite sides of each ring gear, a driven sleeve, and a pair of driven gears connected thereto, each of said driven gears being meshed on opposite sides thereof respectively with the gears associated with the said ring gears.

2. A gearing unit which comprises a driving shaft, a pair of worms thereon, a ring gear meshing with each worm, smaller gears connected on opposite sides of each ring gear, said ring gears spaced apart, and a driven gear disposed between and meshing with the respective smaller gears on each side of the ring gears, the point of mesh between each driven gear and its smaller gears being at opposite points of the driven gear whereby a balance of the thrust is produced.

3. A gear unit comprising a driven sleeve, a pair of driven gears thereon spaced apart along the axis of the sleeve, a pair of smaller driving gears meshing with each driven gear at opposite sides thereof, ring gears disposed between and connected to the smaller driving gears engaging with the driven gears on each side thereof, a driving shaft, and a pair of worms on said driving shaft and meshing with said ring gears.

PAUL V. TROUPE.